United States Patent
Matsuura

[15] 3,680,912
[45] Aug. 1, 1972

[54] HEAD-REST OF THE SHOCK ABSORBING SYSTEM

[72] Inventor: Hirotsugu Matsuura, 8-35 Nishino-cho, Tanabe, Higashisumirjoshi-ku, Osaka, Prefecture, Japan

[22] Filed: Sept. 14, 1970

[21] Appl. No.: 71,724

[52] U.S. Cl. ............... 297/391, 297/216, 297/396, 297/DIG. 3
[51] Int. Cl. .............................................. A47c 7/38
[58] Field of Search...... 297/216, 284, 391, 396, 397, 297/DIG. 3; 5/348

[56] References Cited

UNITED STATES PATENTS

| | | |
|---|---|---|
| 3,042,941 | 7/1962 | Marcus...........................5/348 |
| 2,136,510 | 11/1938 | Jensen..........................297/284 |
| 3,017,221 | 1/1962 | Emery.....................297/DIG. 3 |
| 3,510,150 | 5/1970 | Wilfert..........................297/391 |
| 3,018,492 | 1/1962 | Rosen.............................5/348 |
| 3,374,981 | 3/1968 | Stuckenberger et al.......248/400 |
| 3,403,938 | 10/1968 | Cramer et al................297/391 |

Primary Examiner—Bobby R. Gay
Assistant Examiner—Darrell Marquette
Attorney—George B. Oujevolk

[57] ABSTRACT

A head-rest of the shock absorbing system to be fixed to the seat of a vehicle, such as an automobile and the like, a tubular hollow member formed with elastic material, such as rubber, soft synthetic resin and the like, being maintained inside the head-rest, the inside of said tubular hollow member being filled with fluid, such as liquid, gas and the like, it being so arranged that, only when a shock is applied to the head-rest, the fluid inside the tubular hollow member will flow into an absorbing hollow member communicating with said tubular hollow member through a resistance tube or a check valve.

1 Claim, 11 Drawing Figures

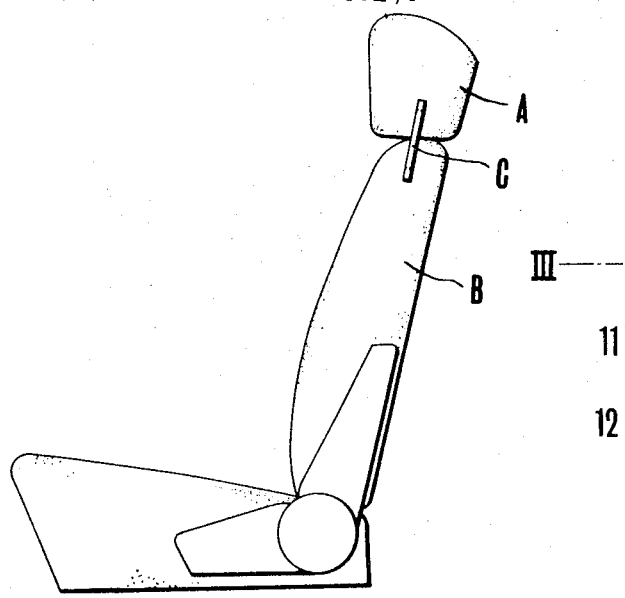
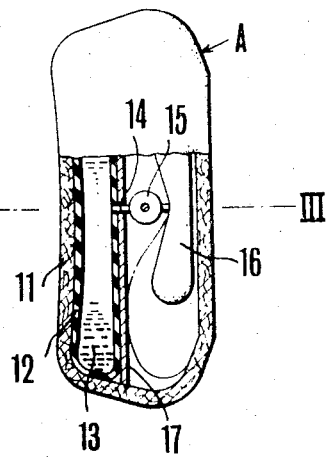
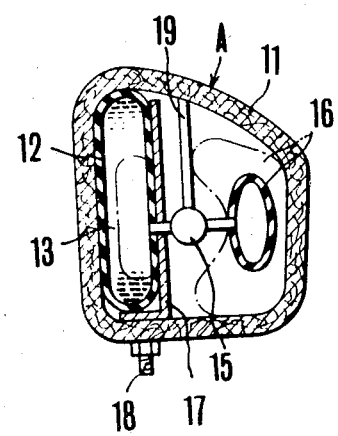
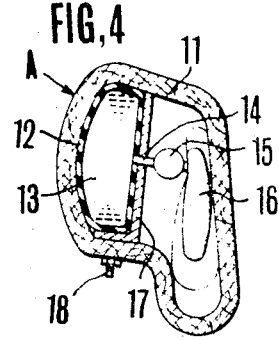

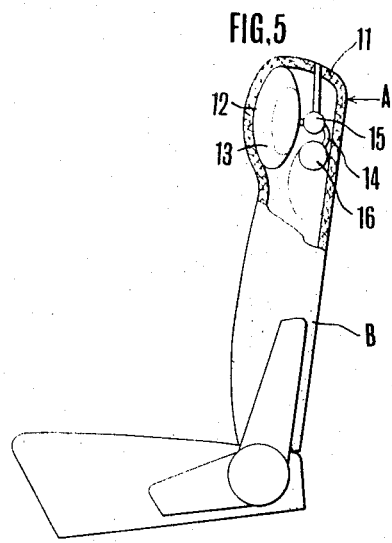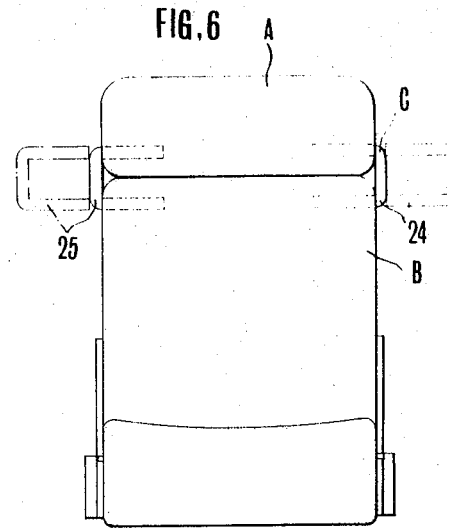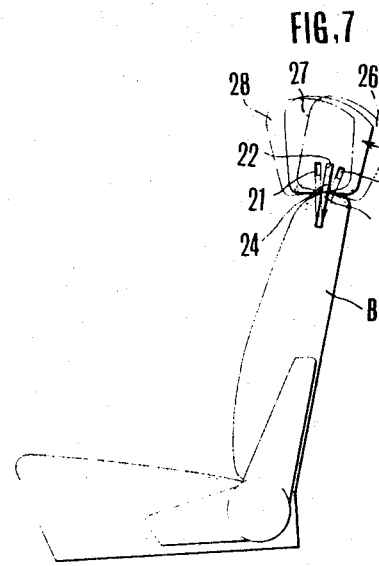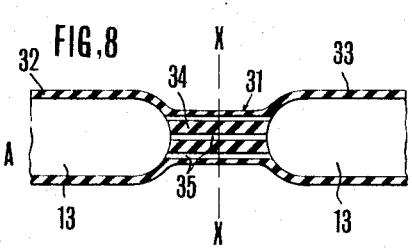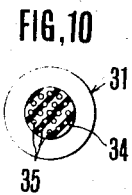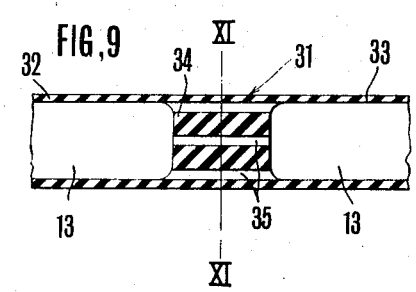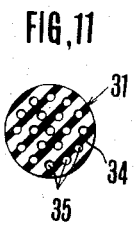

HEAD-REST OF THE SHOCK ABSORBING SYSTEM

This invention relates to a head-rest of the shock absorbing system to be fixed to the seat of a vehicle, such as an automobile and the like.

The first object of the invention consists in substantially reducing a shock applied to the head-rest wherein a tubular hollow member formed with an elastic material, such as rubber, soft synthetic resin and the like, is maintained inside the head-rest instead of constructing said head-rest with an elastic material, such as sponge and the like, the inside of the tubular hollow member being filled with fluid, such as liquid, gas and the like, part of the fluid inside the tubular hollow member, in case a shock is given to the head-rest, flowing into the absorbing hollow member communicating with the tubular hollow member through a check valve or a "resistance tube."

The "resistance tube" consists of elastic tube-like parts with a constricted part interposed therebetween, a number of fine grooves being formed inside the constricted part, as shown in FIG. 8, said constricted part expanding when the fluid is under pressure, thereby allowing said fluid to flow from one tube-like part into the other tube-like part through the fine grooves, as illustrated in FIG. 9. When the fluid 13 is free from pressure, the constricted part 34 remains narrow by constriction thereof with the fine grooves 35 in a blocked state, thereby preventing the fluid 13 from flowing from the tube-like part 32 into the tube-like part 33.

The second object of the invention consists in absorbing the initial impact arising from the shock received by the head-rest by so arranging that the flow of the fluid filled in the tubular hollow member fitted inside the head-rest into the absorbing hollow member will be comparatively slow through a resistance member, such as a check valve, a resistance tube and the like, thereby preventing the driver and the passengers from being subjected to a repulsion resulting from the impact of the head-rest consisting of the known shock-absorbing material, such as sponge and the like.

The third object of the invention consists in so arranging the components that the elastic tubular hollow member filled with fluid and fitted inside the head-rest will communicate with the absorbing hollow member through a check valve or a resistance tube, said fluid being discharged from the tubular hollow member into the absorbing hollow member through a resistance member, such as a check valve, a resistance tube and the like, when an increasing pressure is applied to the tubular hollow member filled with the fluid, said discharged fluid being maintained inside the absorbing hollow member.

The fourth object of the invention consists in so arranging the components that the shock will be transmitted to the head-rest comparatively slowly as a result of a comparatively slow flow of the fluid from the tubular hollow member into the absorbing hollow member owing to the interposition of a resistance member, such as a check valve, a resistance tube and the like, between the tubular hollow member filled with the fluid thereinside and the absorbing hollow member.

The fifth object of the invention consists in so arranging the components that the fluid that has flowed from the tubular hollow member into the absorbing hollow member will be restored to said tubular hollow member through the resistance tube by the elastic contractile force proper to the absorbing hollow member, said absorbing hollow member consisting of material having a greater contractility than that of the tubular hollow member. The fine grooves provided inside the resistance tube enable the fluid inside the absorbing hollow member to be gradually restored to the tubular hollow member by the greater contractility of said absorbing hollow member after said fluid is left as it stands for a short period of time.

In case of the use of a check valve, said check valve is loosened by operating the screw thereof from the outside of the head-rest, thereby allowing the fluid inside the absorbing hollow member to be restored gradually to the tubular hollow member just as in the case of the resistance tube.

The foregoing objects are attainable by the improvement and combination of each component part constituting this invention, the preferred embodiments whereof will become apparent by the detailed description given hereunder in reference to the accompanying drawing. Revisions and modifications as regards the details of the construction are to be included in the claims appearing hereinafter.

FIG. 1 is a side elevation of the seat of an automobile equipped with the head-rest of the invention.

FIG. 2 is a sectional plan showing the essential part of the head-rest.

FIG. 3 is a sectional view taken at III—III in FIG. 2.

FIG. 4 is a cross section of another instance of the embodiment shown in FIG. 3.

FIG. 5 is a side elevation of still another instance of the foregoing embodiment, showing a sectional view of the essential part of the seat wherein the head-rest is integrally fixed to the back-rest.

FIG. 6 is a descriptive figure illustrating the state wherein the head-rest is fixed to the back-rest.

FIG. 7 is a sectional view taken at VII—VII in FIG. 6.

FIG. 8 is a sectional view of the resistance tube used in the invention.

FIG. 9 is a sectional view of the resistance tube in FIG. 8 showing the state wherein the fluid passes through the inside thereof.

FIG. 10 is a sectional view taken at X—X in FIG. 8.

FIG. 11 is a sectional view taken at XI—XI in FIG. 9.

In FIGS. 1 to 4, the head-rest (A) is removably fixed to the upper part of the back-rest (B) by means of linking metals (C) or the like.

As shown in FIGS. 2 to 4, a tubular hollow member 12 formed with elastic material, such as rubber, soft synthetic resin and the like, is fitted inside the outer cover 11 consisting of leather, cushioning material or the like, said tubular hollow member being filled with fluid 13, such as liquid, gas and the like.

It is so arranged that the fluid 13 will flow into the absorbing hollow member 16 communicating with the tubular hollow member 12 through a resistance member 15, such as tube 14, a check valve, a resistance tube 15 and the like. The numeral 17 shows a partition provided between the tubular hollow member 12 and the absorbing hollow member 16, said partition serving as a mounting panel and a reinforcement plate for the tubular hollow member 12 and the absorbing hollow member 16 at the same time. The numeral 18 shows a screw with which to fix the head-rest (A) to the back-rest (B).

In case a check valve is used for the resistance member 15, a screw 19 is provided for opening and closing the check valve from the outside of the head-rest in order to allow the fluid that has flowed from the tubular hollow member 12 into the absorbing hollow member 16 to be restored to the tubular hollow member 12.

Though the absorbing hollow member 16 consists of the same elastic material, such as rubber, soft synthetic resin and the like, as that of the tubular hollow member 12, the absorbing hollow member 16 is so constructed as to have a greater contractile force than that of the tubular hollow member 12.

As mentioned above, if a greater contractility is given to the elastic material of the absorbing hollow member, the fluid that has flowed from the tubular hollow member into the absorbing hollow member as a result of a shock given to the head-rest will be forced to flow back gradually into the tubular hollow member through the resistance member 15 after the impact ceases by the greater contractility characteristics to the absorbing hollow member.

FIG. 5 shows an instance wherein the head-rest (A) is intergrated with the back-rest (B) of the seat. In this case too, a tubular hollow member 12 consisting of elastic material, such as rubber, soft synthetic resin and the like, is fitted inside the head-rest (A) sheathed with an outer cover consisting of leather, cushioning material or the like, said tubular hollow member 12 being filled with fluid 13, such as liquid, gas and the like, inside thereof. It is so arranged that the fluid 13, exclusively when a shock is applied to the head-rest (A), will flow into the absorbing hollow member 16 communicating with the tubular hollow member 12 through the resistance member 15, such as a tube 14, a check valve, a resistance tube and the like.

FIGS. 6 and 7 show a state wherein the head-rest (A) of the invention has been fixed to the back-rest (B), a number of insertion holes 21, 22, 23 being provided on both sides of the head-rest (A), an insertion hole 24 being likewise provided on both sides of the upper part of the back-rest (B), fixing rods 25, which have a front form respectively in the shape of the letter U placed horizontally, being inserted into the insertion holes 21 and 24, 22 and 24 or 23 and 24, thereby fixing the head-rest (A) in the position of 26, 27 or 28 according to the requirement, that is, the head-rest (A) can be fixed in any of the positions, 26, 27 or 28, making use of the fixing rods 25.

FIGS. 8 to 11 show the resistance tube used in the invention, said resistance tube consisting of a tubular member 31 made of elastic material, such as rubber and the like, a constricted part 34 being formed between the tube-like parts, 32, 33, a number of fine grooves 35 being provided through the inside of the constricted part 34, said constricted part 34 expanding when the fluid 13 flows under pressure from one tube-like part 32 into the other tube-like part 33 so that the fine grooves 35 thereof will allow the fluid 13 to pass therethrough.

In case the fluid 13 is free from pressure, the constricted part 34 remains narrowly constricted with the fine grooves 35 thereof in a blocked state, thereby preventing the fluid 13 from flowing from the tube-like part 32 into the tube-like part 33.

As described heretofore, the head-rest (A) of the invention prevents an accident arising from a shock, for instance, an unexpected collision of automobiles while running or parking, by reducing the impact thereof, the shock given to the head-rest being turned into a pressure to the fluid inside the tubular hollow member consisting of elastic material, said fluid flowing into the absorbing hollow member through a resistance member, such as a check valve, a resistance tube and the like.

On receipt of a shock, the fluid inside the tubular hollow member flows into the absorbing hollow member, with its volume decreased and its pressure increased, through a check valve or a resistance tube. A given quantity of fluid is forced to flow through a check valve or a resistance tube which consists of an elastic material having an extremely great contractility.

Moreover, in case a dashboard is formed in the same construction as that of the abovementioned head-rest of the invention; that is, a tubular hollow member filled with liquid or gas being maintained inside the dashboard, it being so arranged that, when a shock is applied to said dashboard, the fluid will be forced to flow from the tubular hollow member into the absorbing hollow member communicating with said tubular hollow member through a resistance member, thereby causing said dashboard to absorb the impact in case of an automobile collision; the case of the foregoing construction is also to be included in the embodiments of the invention.

What is claimed is:
1. A head-rest comprising in combination:
 a. an outer cover (11) with an inner wall defining a hollow space therein;
 b. a resilient tubular hollow first member (12) along one side of said inner wall with a fluid (13) therein;
 c. a resilient hollow absorbing second member (16) within said hollow space;
 d. a resistance valve connection (31) between said first and second members including first and second tube-like parts (32, 33), a constriction (34) between said parts with grooves (35) therein limiting fluid flow between said members; and,
 e. fixing rods (25) for connection of said head-rest to a vehicle component, whereby, when subjected to a shock, said shock is absorbed by said constricted fluid flow across said resistance connection.

* * * * *